United States Patent
Kahn (10) Patent No.: US 8,560,234 B2
(45) Date of Patent: Oct. 15, 2013

(54) SYSTEM AND METHOD OF NAVIGATION BASED ON STATE ESTIMATION USING A STEPPED FILTER

(75) Inventor: Aaron D. Kahn, Arlington, VA (US)

(73) Assignee: The United States of America, as represented by the Secretary of the Navy, Washington, DC (US)

(*) Notice: Subject to any disclaimer, the term of this patent is extended or adjusted under 35 U.S.C. 154(b) by 402 days.

(21) Appl. No.: 12/432,897

(22) Filed: Apr. 30, 2009

(65) Prior Publication Data
US 2011/0202204 A1    Aug. 18, 2011

Related U.S. Application Data

(60) Provisional application No. 61/052,738, filed on May 13, 2008.

(51) Int. Cl.
G01C 21/00    (2006.01)
G01C 21/10    (2006.01)
G01S 1/00    (2006.01)
G01S 5/02    (2010.01)

(52) U.S. Cl.
USPC ........... 701/480; 701/468; 701/470; 701/479; 701/500; 701/509; 701/510; 701/534; 701/535; 701/536

(58) Field of Classification Search
USPC .......................................... 701/480, 510, 536
See application file for complete search history.

(56) References Cited

U.S. PATENT DOCUMENTS

| 5,268,594 A * | 12/1993 | Huang | 327/172 |
|---|---|---|---|
| 6,456,906 B1 | 9/2002 | Hua | |
| 7,260,026 B1 * | 8/2007 | Wu | 368/47 |
| 7,579,984 B2 * | 8/2009 | Wang et al. | 342/357.59 |
| 7,643,939 B2 * | 1/2010 | Zeng et al. | 701/220 |
| 2005/0251328 A1 * | 11/2005 | Merwe et al. | 701/200 |
| 2007/0115378 A1 * | 5/2007 | Wang | 348/308 |
| 2010/0262639 A1 * | 10/2010 | Suzuki et al. | 708/201 |

OTHER PUBLICATIONS

Greg Welch and Gary Bishop, "SCAAT: Incremental Tracking with Incomplete Information", 1997, available at http://dl.acm.org/citation.cfm?id=258876.*
Mahmood R. Azimi-Sadjadi, Tongxin Lu, and Eduardo M. Nebot, "Parallel and Sequential Block Kalman Filtering and Their Implementations Using Systolic Arrays", IEEE Transactions on Signal Processing, vol. 39, No. I, Jan. 1991.*
International Search Report and Written Opinion of the ISA, May 11, 2009, for PCT/US09/43419.
Farrell, J., Barth, M., "The Global Positioning System and Inertial Navigation", McGraw-Hill, 1999, Ch 4, pp. 95-139.
Gelb, A., "Applied Optimal Estimation", The MIT Press, Cambridge, MA, 1999, Ch.6, pp. 180-224.

* cited by examiner

*Primary Examiner* — Ryan Zeender
*Assistant Examiner* — Allen Chein
(74) *Attorney, Agent, or Firm* — US Naval Research Laboratory; Sally A. Ferrett (57) ABSTRACT

Embodiments include systems and methods of navigation. In on embodiment, a plurality of position and motion states of a vehicle are estimated. The states may be estimated based on information received from a satellite receiver and an inertial measurement sensor. Estimating the states comprises performing one or more of a plurality of update steps at the rate that information is received from the satellite receiver. The states are estimated at a rate greater than the rate at which the update steps are performed. In one embodiment, the states are estimated using a stepped extended Kalman filter.

14 Claims, 4 Drawing Sheets

FIG. 4

SYSTEM AND METHOD OF NAVIGATION BASED ON STATE ESTIMATION USING A STEPPED FILTER

CROSS REFERENCE TO RELATED APPLICATIONS

This application is a non-provisional under 35 USC 119(e) of, and incorporates by reference in its entirety, U.S. Provisional Patent Application No. 61/052,738, entitled "Loosely Coupled GPS/INS Using a Stepped Kalman Filter," and filed on May 13, 2008.

BACKGROUND OF THE INVENTION

1. Field of the Invention

The disclosed embodiments relate to systems and methods for navigation based on state estimation using a stepped filter.

2. Description of the Related Technology

A vehicle navigation system should analyze the position and motion of the vehicle in order to determine the adjustments necessary to maintain the vehicle on the desired course. The Global Positioning System and an inertial navigation system are two types of systems that may be used to provide information about a vehicle's position and motion. An extended Kalman filter is a state estimation platform that may be used as a mechanism to integrate a Global Positing System and an inertial navigation system in order to compute a more accurate solution.

SUMMARY OF CERTAIN INVENTIVE ASPECTS

The system, method, and devices of the invention each have several aspects, no single one of which is solely responsible for its desirable attributes. Without limiting the scope of this invention as expressed by the claims which follow, its more prominent features will now be discussed briefly. After considering this discussion, and particularly after reading the section entitled "Detailed Description of Certain Embodiments" one will understand how the features of this invention provide advantages that include a method of navigation requiring less processing power.

One embodiment includes a method of estimating a plurality of position and motion states of a vehicle. The method includes receiving by a processor first data indicative of acceleration and angular rate of the vehicle from an inertial measurement sensor disposed proximal to the vehicle and receiving by the processor second data indicative of position and velocity of the vehicle based on satellite data received by a receiver disposed proximal to the vehicle. The second data indicative of position and velocity of the vehicle is received. The method further include estimating the plurality of position and motion states of the vehicle based at least in part on the first and second data. Estimating the states comprises performing one of a plurality of update steps so as to estimate the states based on the plurality of update steps at a first rate and the states are estimated based on an inertial estimate at a second rate that is greater than the first rate.

One embodiment includes a system estimating a plurality of position and motion states of a vehicle. The system includes a memory configured to store data associated with a plurality of position and motion states of a vehicle and a processor configured to receive by a processor first data indicative of acceleration and angular rate of the vehicle from an inertial measurement sensor disposed proximal to the vehicle, and receive by the processor second data indicative of position and velocity of the vehicle based on satellite data received by a receiver disposed proximal to the vehicle. The second data indicative of position and velocity of the vehicle is received. The processor is further configured to estimate the plurality of position and motion states of the vehicle based at least in part on the first and second data. Estimating the states comprises performing one of a plurality of update steps so as to estimate the states based on the plurality of update steps at a first rate. The states are estimated based on an inertial estimate at a second rate that is greater than the first rate.

One embodiment includes a computer-program product for estimating a plurality of position and motion states of a vehicle. The product comprises a computer-readable medium having stored thereon codes executable by at least one processor to perform the method comprising the method includes receiving by a processor first data indicative of acceleration and angular rate of the vehicle from an inertial measurement sensor disposed proximal to the vehicle and receiving by the processor second data indicative of position and velocity of the vehicle based on satellite data received by a receiver disposed proximal to the vehicle. The second data indicative of position and velocity of the vehicle is received. The method further include estimating the plurality of position and motion states of the vehicle based at least in part on the first and second data. Estimating the states comprises performing one of a plurality of update steps so as to estimate the states based on the plurality of update steps at a first rate and the states are estimated based on an inertial estimate at a second rate that is greater than the first rate.

One embodiment includes a system estimating a plurality of position and motion states of a vehicle. The system includes means for storing data associated with a plurality of position and motion states of a vehicle and a means for processing configured to receive by first data indicative of acceleration and angular rate of the vehicle from an inertial measurement sensor disposed proximal to the vehicle, and receive second data indicative of position and velocity of the vehicle based on satellite data received by a receiver disposed proximal to the vehicle. The second data indicative of position and velocity of the vehicle is received. The processing means is further configured to estimate the plurality of position and motion states of the vehicle based at least in part on the first and second data. Estimating the states comprises performing one of a plurality of update steps so as to estimate the states based on the plurality of update steps at a first rate. The states are estimated based on an inertial estimate at a second rate that is greater than the first rate.

DETAILED DESCRIPTION OF CERTAIN EMBODIMENTS

The following detailed description is directed to certain specific embodiments of the invention. However, the invention can be embodied in a multitude of different ways as defined and covered by the claims. In this description, reference is made to the drawings wherein like parts are designated with like numerals throughout.

A vehicle control system analyzes information about the vehicle's state, such as velocity and position information. The state information is used as an input into a navigation system so that the vehicle velocity and position can be adjusted if necessary to maintain the vehicle on the desired course. The vehicles state after any adjustment is then measured and provided to the navigation system as well.

A Global Positioning System ("GPS") receiver may be used to calculate a position of an object by calculating the time between receiving signals transmitted by GPS satellites. However, GPS is susceptible to several problems, including slow update, interferences, multipath distortion, and outages. Unlike GPS, an inertial navigation system ("INS") measures position and motion based on motion sensors without the use of an external reference. INS is accurate in the short term. However, errors in acceleration and velocity become larger errors over time, decreasing the accuracy of the system. In a system combining INS and GPS, the errors in acceleration and velocity can be stabilized.

Kalman filtering provides a method for combining imperfect information from a GPS and INS to estimate the positional and navigational information about a moving body. For example, an INS may be used with a GPS receiver by using the processed output of the GPS receiver in an extended Kalman filter ("EKF") that is used to combine positional estimates based on the two data sources, resulting in what is known as a loosely coupled GPS aided INS.

The EKF is a time domain function, and the EKF may be propagated forwards in time on a computer at the same rate that the inertial navigation equations are mechanized. This results in a stable solution of the navigational state but at the expense of being computationally expensive. Processing associated with the EKF becomes a limiting factor as to the speed of updating the state estimate. This may become problematic if a desired rate of state information for vehicle control is at a high rate use of a low-performance navigation computer is further desired.

In one embodiment, a GPS aided INS is provided via a novel stepped EKF in which the EKF equations are reformulated as sub-steps using an assumption of time separation. The time separation assumption is based on the fact that the EKF is computing the statistics of the relationships between the states. Under normal dynamics of a rigid body these relationships do not change quickly relative to the rate of change of the states. Using this fact it is then possible to propagate the EKF equations at a relatively lower update rate than that at which the inertial navigation equations are propagated. Hence, the EKF equations can then be formulated as a series of sub-steps, each one being computationally simple. By performing calculations in such suitable sub-steps, no loss of accuracy or stability of the solution has been observed in actual tests of an embodiment of such a navigation system.

Moreover, by reformulating the EKF equations as sub-steps, the filter is made computationally simpler, thereby allowing implementation on small, low-performance microcontrollers, yet still allowing for high update rates of the state. This can be advantageous in embodiments in which cost, power, and weight are critical, for example, when the navigation system is used on small unmanned aerial vehicles or on expendable devices or any other application in which any of cost, power consumption, or weight is a driving factor in system design.

Figure 1:
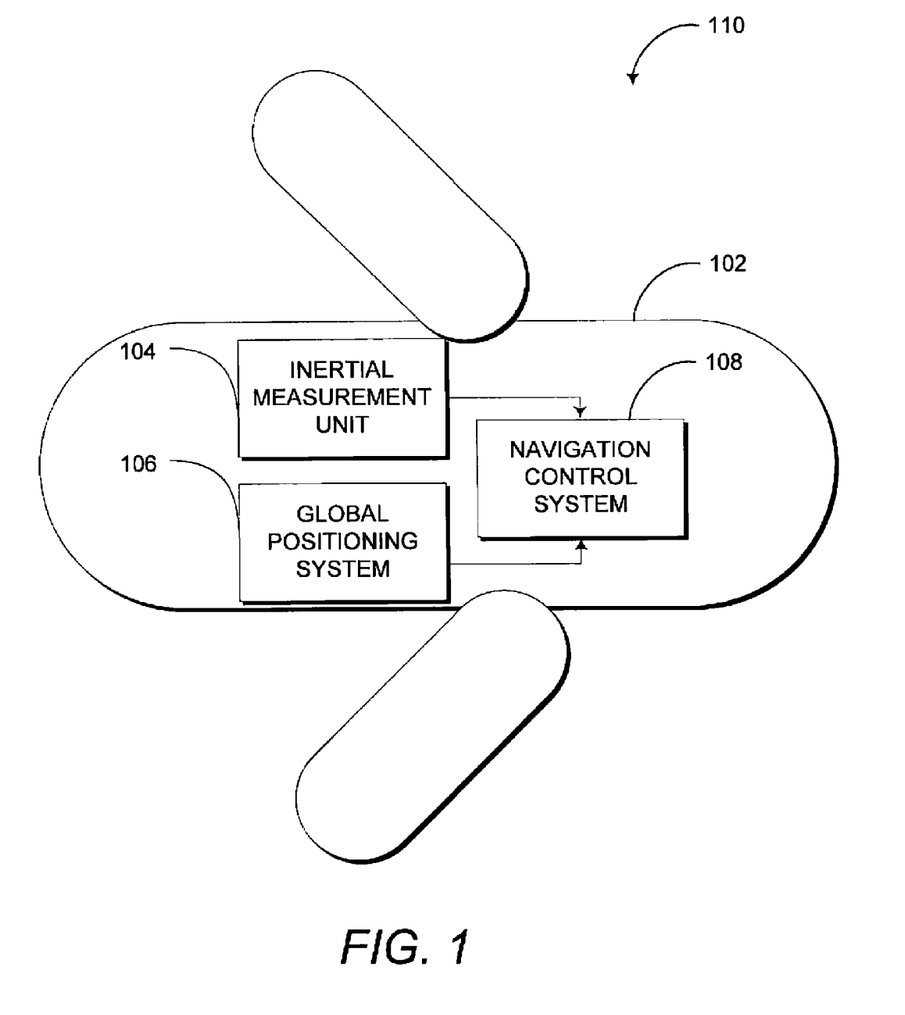
FIG. 1 is a block diagram illustrating one embodiment of an embedded navigation system.

FIG. 1 is a block diagram illustrating one embodiment of an embedded navigation system 110. The embedded navigation system 110 includes a vehicle 102 with an embedded inertial measurement unit (IMU) 104, GPS 106, and navigation control system 108. In one embodiment, the vehicle 102 is an aircraft. In another embodiment, the vehicle is a terrestrial, ocean, or space vehicle. The IMU 104 and GPS 106 send information to the navigation control system 108. In one embodiment, the navigation control system 108 controls the navigation of the vehicle 102. The navigation system 110 is illustrated in further detail in FIG. 2.

Figure 2:
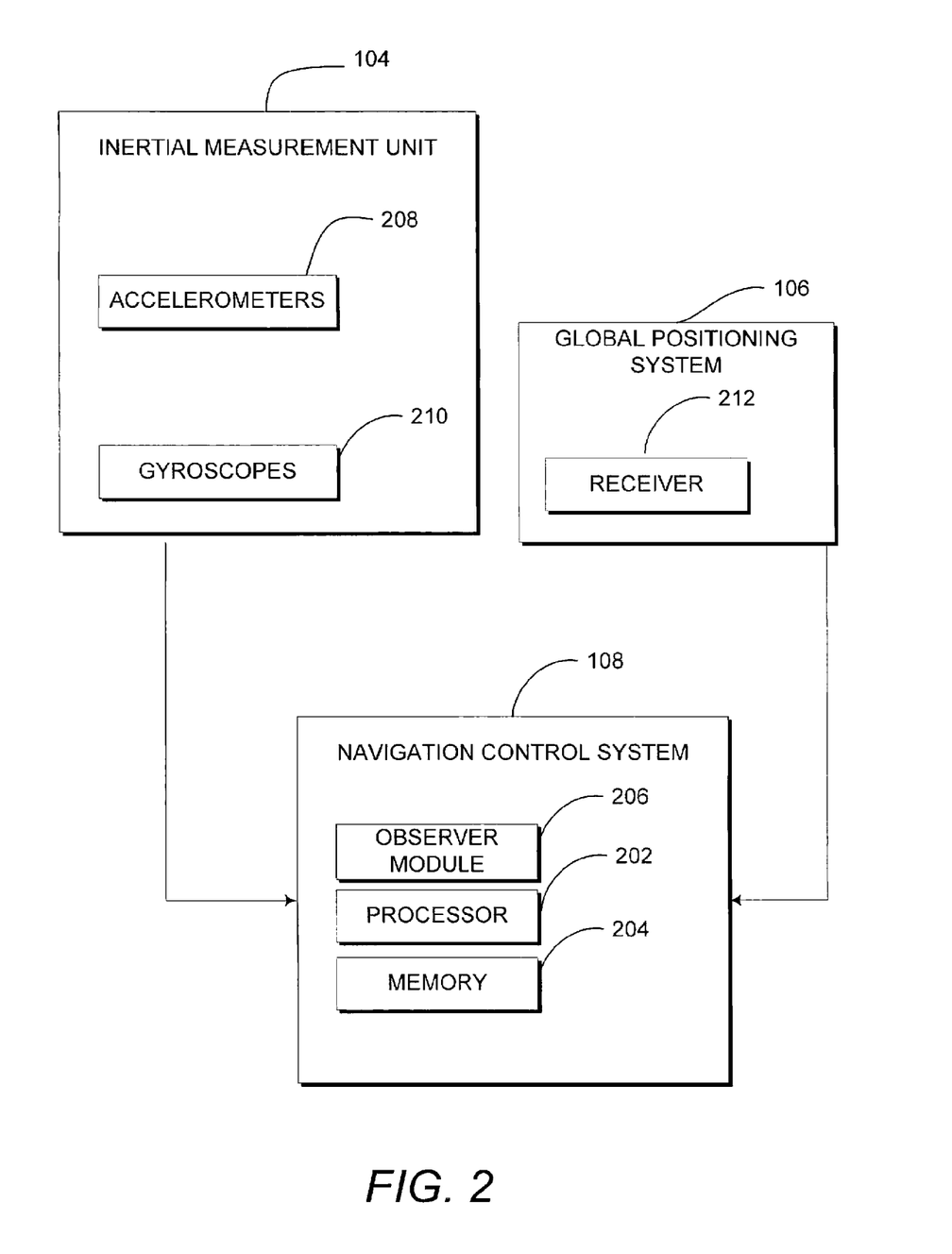
FIG. 2 is a block diagram illustrating one embodiment of a navigation system.

FIG. 2 is a block diagram illustrating one embodiment of the navigation system 110. The IMU 104 houses sensors that may include an orthogonal set of accelerometers 208 and gyroscopes 210 that provide information to the navigation control system 108. The GPS 106 contains a GPS receiver 212 for receiving a satellite signal. The GPS 106 also provides information to the navigation control system 108. The navigation control system 108 includes an observer module 206, a processor 202, and a memory 204. The observer module 206 estimates the current and predicted future state of the vehicle 102. In one embodiment, the observer module 206 executes instructions on the processor 202 and stores information in the memory 204.

In one embodiment, the navigation system 110 operates in two modes. Initially, the navigation system 110 operates in an alignment mode. The purpose of the alignment mode is to compute an initial state vector containing information about the state of the vehicle 102 and to determine whether the GPS receiver 212 has computed a valid solution. In this mode the accelerometers 208 and the rate gyroscopes 210 of the IMU 104 are mechanized using a complementary filter to estimate the attitude of the vehicle 102. In the complimentary filter shown below, $\Phi$ is the roll, $\Theta$ is the pitch, and $\Psi$ is the yaw Euler angle attitude of the vehicle 102. K is the Kalman gain, g is gravity, and $a_x$, $a_y$, $a_z$ is the x, y, z body-axis specific force measured from the IMU 104. In one embodiment, Equations 1-9, below, are calculated during alignment mode.

$$\hat{g} = \|a\| \tag{1}$$

$$\Phi^{meas} = -\tan^{-1}\left(\frac{a_y}{-a_z}\right) \tag{2}$$

$$\Theta^{meas} = \sin^{-1}\left(\frac{a_x}{g}\right) \tag{3}$$

$$\Psi^{meas} = \tan^{-1}\left(\frac{V_e^{meas}}{V_n^{meas}}\right) \tag{4}$$

$$\begin{bmatrix} \dot{\Phi} \\ \dot{\Theta} \\ \dot{\Psi} \end{bmatrix} = \begin{bmatrix} 1 & \tan(\hat{\Theta})\sin(\hat{\Phi}) & \tan(\hat{\Theta})\cos(\hat{\Phi}) \\ 0 & \cos(\hat{\Phi}) & -\sin(\hat{\Phi}) \\ 0 & \frac{\sin(\hat{\Phi})}{\cos(\hat{\Theta})} & \frac{\cos(\hat{\Phi})}{\cos(\hat{\Theta})} \end{bmatrix} \omega \tag{5}$$

$$\begin{bmatrix} \hat{\Phi} & \hat{\Theta} & \hat{\Psi} \end{bmatrix}^T = \int \begin{bmatrix} \dot{\Phi} & \dot{\Theta} & \dot{\Psi} \end{bmatrix}^T \Delta t \tag{6}$$

$$\hat{\Phi} = \hat{\Phi} + K(\Phi^{meas} - \hat{\Phi}) \tag{7}$$

$$\hat{\Theta} = \hat{\Theta} + K(\Theta^{meas} - \hat{\Theta}) \tag{8}$$

$$\hat{\Psi} = \hat{\Psi} + K(\Psi^{meas} - \hat{\Psi}) \tag{9}$$

In one embodiment, once the GPS solution derived in the alignment mode is determined to be valid, the navigation system 110 enters navigation mode. During navigation mode, the position and motion states of the vehicle 110 are measured in order to determine the position and attitude related state in a vehicle. Such data can be provided to a control module configured to determine what adjustments are to be made to maintain the vehicle on a desired path at a desired velocity.

In one embodiment, the plurality of position and motion states measured and estimated include the following states of the inertial platform: position in Earth-Centered Earth-Fix coordinate system ("ECEF") frame, velocity in north, east, down tangent frame, attitude quaternion, rate gyroscope bias, and gravity. A superscript ˆ indicates that an element is an estimated element. A state vector $\overline{X}$ is shown below in equation 10 with the respective positional and other vehicle navigation related states that comprise the state vector:

$$\overline{X} = [XYZV_n V_e V_d q_0 q_1 q_2 q_3 \delta p \delta q \delta rg]^T \quad (10)$$

Figure 3:
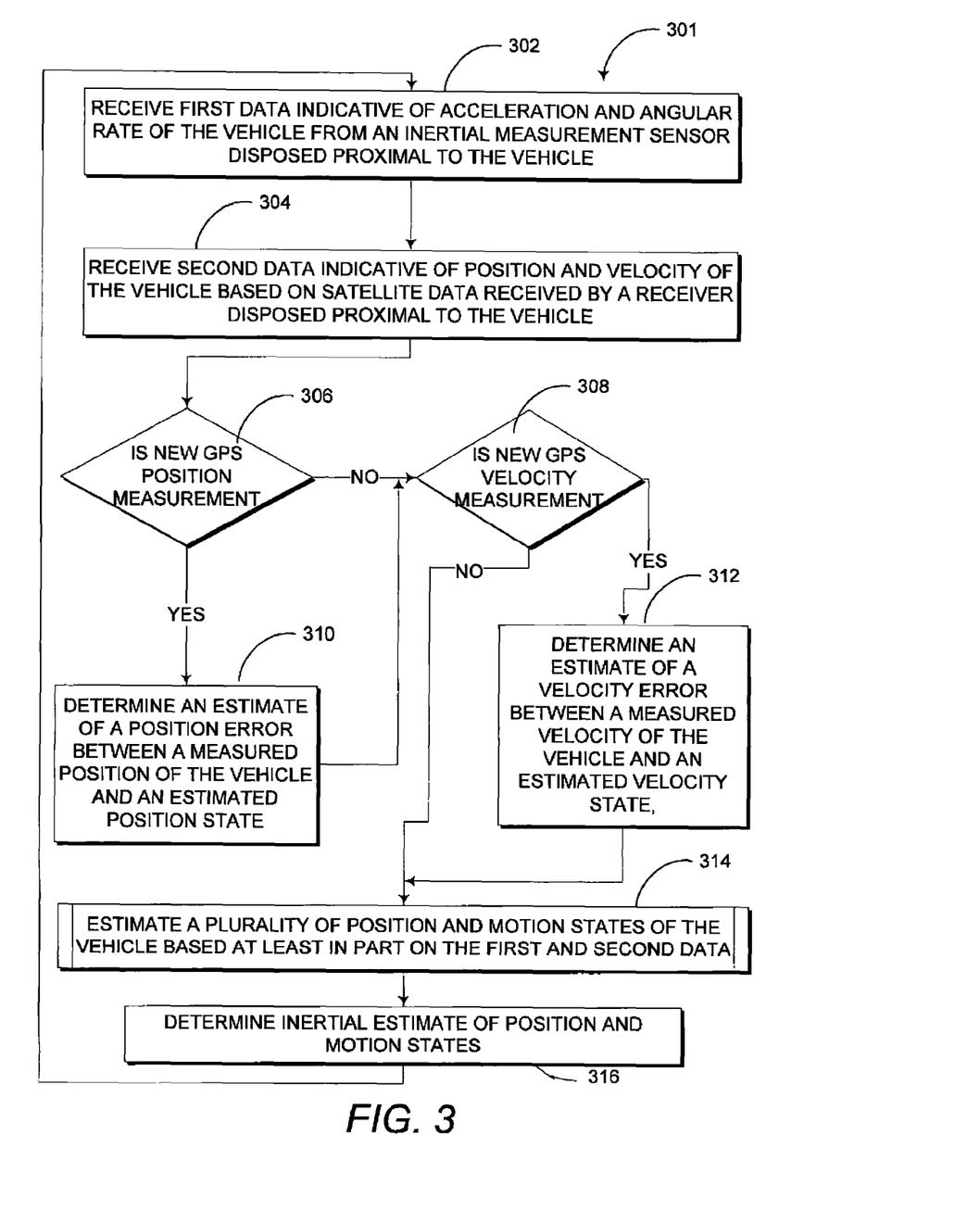
FIG. 3 is a flow diagram illustrating one embodiment of a method for estimating a plurality of position and motion states of a vehicle.

FIG. 3 is a flow diagram illustrating one embodiment of a method 301 for estimating a plurality of position and motion states of the vehicle 102. Beginning at a block 302, the observer module 206 receives first data indicative of acceleration and angular rate of the vehicle 102 from an inertial measurement sensor disposed proximal to the vehicle 102. In one embodiment, the inertial measurement sensor is the IMU 104. The rate gyroscopes 210 provide a measurement of the angular velocity, ω, and the accelerometers 208 provide a measurement of the specific force, a. The definitions of these values are shown below as x,y,z vectors in equations 11 and 12:

$$\omega = [pqr]^T \quad (11)$$

$$a = [a_x a_y a_z]^T \quad (12)$$

Continuing to a block 304, the observer module 206 receives second data indicative of position and velocity of the vehicle 102 based on satellite data received by a receiver disposed proximal to the vehicle 102. In one embodiment, the receiver is a GPS receiver, such as the GPS receiver 212. The GPS 106 receiver provides position measurements, $Pos^{meas}$, and velocity measurements $Vel^{meas}$. The superscript$_{meas}$ indicates that an element is a measured element. The definitions of these measurements are shown below in equations 13 and 14:

$$Pos^{meas} = [X^{meas} Y^{meas} Z^{meas}]^T \quad (13)$$

$$Vel^{meas} = [V_n^{meas} V_e^{meas} V_d^{meas}]^T \quad (14)$$

Continuing to a decision step 306, the observer module 206 determines whether the position measurement from the GPS 106 is different from the previous position measurement. Proceeding to a block 310, if a new position is received from the GPS 106, the observer module 206 determines an estimate of a velocity error between a measured velocity of the vehicle 102 and an estimated velocity state.

Continuing to a decision block 308, if a new position measurement is not received from the GPS 106, the observer module 206 then determines whether a new velocity measurement has been received from the GPS 106. If a new velocity measurement has been received from the GPS 106, at a block 312, the observer module 206 determines an estimate of a velocity error between a measured velocity of the vehicle 102 and an estimated velocity state.

If a new velocity measurement is not received from the GPS 106, continuing to a block 314, the observer module 206 estimates a plurality of position and motion states of the vehicle 102 based at least in part on the first and second data via the EKF. In one embodiment, the first data is data from the IMU 104 and the second data is data from the GPS 106.

In one embodiment, the vehicle 102 state estimates are provided to a control system (not shown) to determine whether adjustments should be made to the vehicle 102 in order to maintain the vehicle 102 on the desired course at the desired velocity. In one embodiment, the observer module 206 or the navigation control system 108 outputs data indicating a portion of the vehicle 102 states to a control unit configured to control motion of the vehicle 102. In another embodiment, the navigation control system 108 or the observer module 206 outputs a control signal indicating the states of the vehicle 102.

In one embodiment, the observer module 206 estimates the states at the block 314 by performing one of a plurality of update steps at the rate that data is received from the GPS 106. However, the observer module 206 estimates the plurality of states at a rate greater than the rate at which the update steps are performed. A number of iterations of estimation can take place before reaching the update steps where the velocity error and position error are determined because a number of iterations may take place before receiving new position or velocity information from the GPS 106.

Next at a block 316, the position and motion states are determined based on propagation of inertial equations over the time Δt. As shown in FIG. 3, following the block 316, the method 301 is repeated as new data is received. In one embodiment, the data is received at a first rate while the observer module 206 again receives data from the IMU 104 at the block 302 and receives data from the GPS 106 at the block 304. The states are propagated forward at the update rate of Δt in block 316, with the reception of new IMU data at block 302. The update of the states due to the GPS measurements at block 302 is at a lower rate. The update of the covariance matrix is performed at a lower rate than the propagation of the states in block 316 because this step is done with a multitude of sub-steps. Each of these sub-steps is performed within the Δt time step.

In one embodiment, the EKF is used to estimate the plurality of states based on the GPS and IMU data. The EKF is a recursive state estimator that uses the estimated state from the previous step and the measurement in order to estimate the current state. The EKF has two phases, a predict step and an update step. The predict step includes projecting the next state as the future error covariance. The update step includes computing the Kalman gain, updating the estimate, and updating the error covariance based on received measurements.

The prediction step of the EKF comprises first calculating a state transition matrix A, which as shown below in equation 15 is the Jacobean of the derivative of the system states, $\overline{X}$, which as discussed above is the state vector:

$$A = \left[\frac{\partial \dot{\overline{X}}}{\partial \hat{\overline{X}}}\right]_t \in R^{n,n} \quad (15)$$

The covariance matrix P represents the statistical variance of each state with respect to the other states. Q is a process noise matrix which is used to factor in the error due to process noise. The angular velocity, ω, is measured from the rate gyroscopes 210 in the IMU 104, and the specific force a is measured from the accelerometers 208 in the IMU 104. Thus, the estimation during the prediction step is based on information from the IMU 104. The calculations performed during the prediction step according to one embodiment are shown below in equations 16 and 17:

$$\dot{P} = AP + PA^T + Q \quad (16)$$

$$\dot{\hat{X}} = f(\hat{X}, \omega, a) \quad (17)$$

In one embodiment, when a new GPS position or velocity measurement is read, the error between the estimated position or velocity, and the measured position or velocity is computed at that time. These calculations are part of the update step of the EKF. Because the update step is performed when a new GPS position or velocity measurement is read, a number of iterations of the prediction step can take place before reaching the update steps. It is assumed that the error between the measurement and state at this time will be approximately the same when the update is actually computed, and it has been found in practice that this assumption holds.

The measured position and velocity are used in the EKF update step. An estimated error value is calculated that determines the error between the estimated position and velocity and the measured position and velocity. This information is then used as an input into the prediction step in order to correct the algorithm.

Several steps are calculated at the EKF update step. The matrix C is a measurement matrix which is the Jacobean of the update function $g(\overline{X})$. R is a measurement noise matrix. The Kalman gain K is used to perform the update of the state and covariance matrix. The calculations performed during the update step according to one embodiment are shown below in equations 18-21:

$$C = \left[\frac{\partial g(\hat{X})}{\hat{X}}\right]_t \in R^{n,m} \quad (18)$$

$$K = PC^T(CPC^T + R)^{-1} \quad (19)$$

$$\hat{\hat{X}} = \hat{X} + K\left(\overline{X}^{meas} - g(\hat{X})\right) \quad (20)$$

$$P = P - KCP \quad (21)$$

In one embodiment, the EKF update functions are only performed when new position or velocity information is received from the GPS 106. The components of the EKF are computed in multiple steps, thereby reducing the computation load at each time step.

Figure 4:
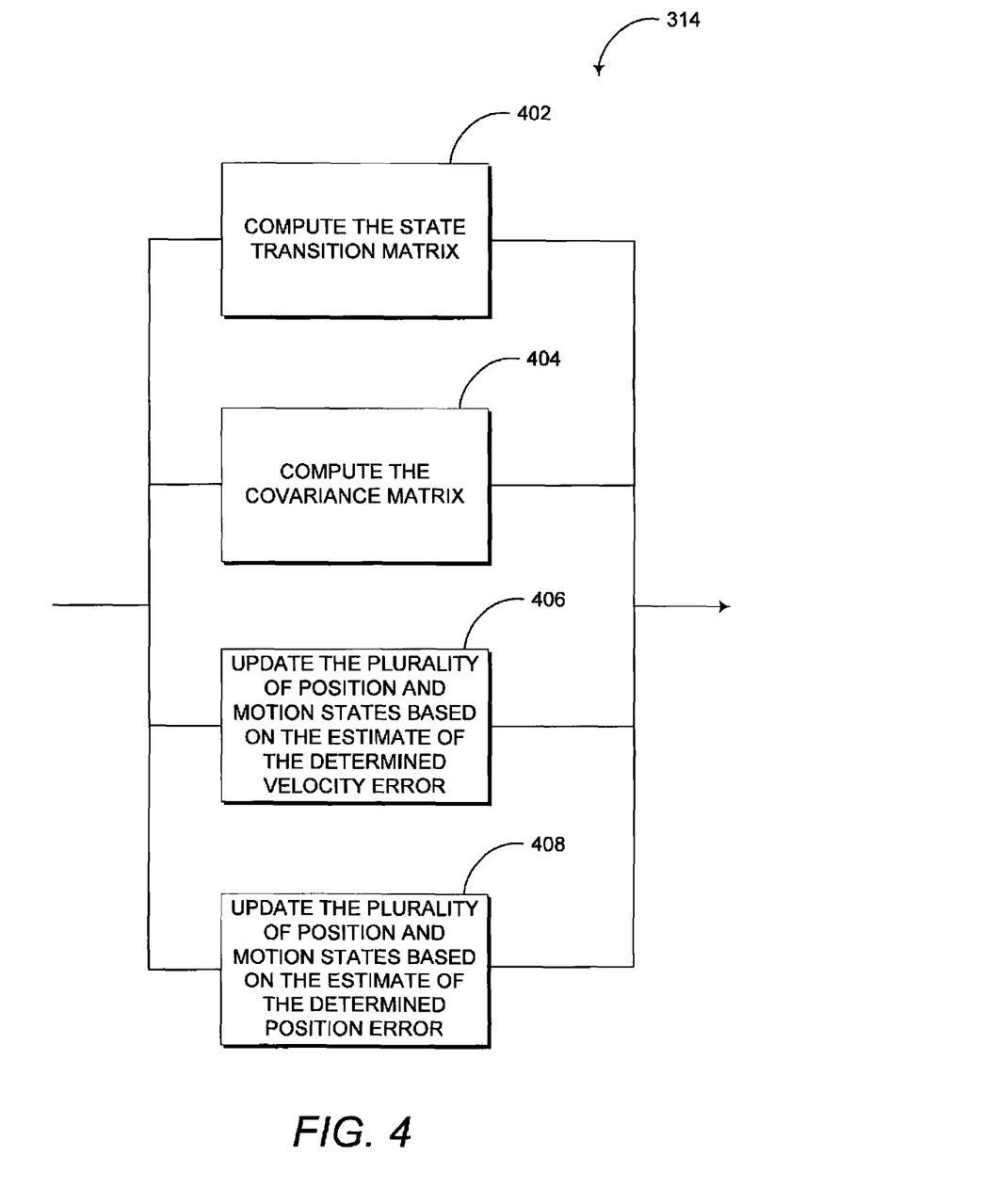
FIG. 4 is a flow diagram illustrating one embodiment of a method of updating a plurality of position and motion states.

FIG. 4 is a flow diagram illustrating one embodiment of a method 410 of updating a plurality of position and motion states in a step wise fashion. At a block 402, the observer module 206 computes the state transition matrix A. In the first step of this computation, the current value of the state vector is saved for future steps. In one embodiment, the computation is performed over $n_A$ steps. Continuing to a block 404, which may be performed alternatively, e.g., in a different step than the block 402, the observer module 206 computes a covariance matrix P. In one embodiment, once the computation of the matrix A is complete, the calculation of the covariance matrix P is performed over $n_p$ steps. Moving to a block 406, which may be performed alternatively, e.g., in a different step than the blocks 402 and 404, the observer module 206 updates the plurality of position and motion states of the vehicle 102 based on the estimate of the determined velocity error. In one embodiment, after the calculation of the P matrix, the velocity measurement update is performed. If a new velocity measurement has been received from the GPS 106, the actual measurement update may be performed in $n_{vel}$ steps. Otherwise, in order to maintain the correct time synchronization, $n_{vel}$ blank steps may be performed. Proceeding to a block 408, which may be performed alternatively, e.g., in a different step than the blocks 402, 404, and 406, the observer module 206 updates the plurality of position and motion states of the vehicle 102 based on the estimate of the determined position error. If a new position measurement has been received from the GPS 106, the position update may be performed in in $n_{pos}$ steps. Otherwise, $n_{pos}$ blank steps may be performed to maintain synchronization. In one embodiment, a single subblock of the method 410 is performed as part of a step. In another embodiment, at least two of the subblocks of the block 410 are performed in a step.

In one embodiment, the integration time step for the covariance matrix P, integration time step $\Delta t_P$ is computed using the equation below in equation 22:

$$\Delta t_P = (n_A + n_P + n_{vel} + n_{pos})\Delta t \quad (22)$$

The value $\Delta t$ is the time step for the integration of the state vector, or the reciprocal of the system update rate. Hence, in the illustrated embodiment, the system updates via the inertial equations are propagated every $\Delta t$ while the EKF estimate is performed every $\Delta t_p$ such that the position and motion states are updated via the inertial equations at a higher rate than the EKF based estimates are updated.

It can be seen from equation 22 that each of these sub-steps is performed within the time step $\Delta t$. The time step $\Delta t$ is the time between measurements of the IMU 104.

In one alternative embodiment, the EKF is updated in steps only for the calculation of the covariance matrix P, where most of the effort takes place, and the other portions of the update process are not performed in steps at a different rate than the rate at which data is received.

In view of the above, one will appreciate that embodiments overcome the problem of estimating positional and velocity state in a vehicle using a lower throughput processor or processing circuit.

It is to be recognized that depending on the embodiment, certain acts or events of any of the methods described herein can be performed in a different sequence, may be added, merged, or left out all together (e.g., not all described acts or events are necessary for the practice of the method). Moreover, in certain embodiments, acts or events may be performed concurrently, e.g., through multi-threaded processing, interrupt processing, or multiple processors, rather than sequentially.

Those of skill will recognize that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

While the above detailed description has shown, described, and pointed out novel features of the invention as applied to various embodiments, it will be understood that various omissions, substitutions, and changes in the form and details of the device or process illustrated may be made by those skilled in the art without departing from the spirit of the invention. As will be recognized, the present invention may be embodied within a form that does not provide all of the features and benefits set forth herein, as some features may be used or practiced separately from others. The scope of the invention is indicated by the appended claims rather than by the foregoing description. All changes which come within the meaning and range of equivalency of the claims are to be embraced within their scope.

What is claimed is:

1. A method of estimating a plurality of vehicle dynamic states, the method comprising:
    receiving, by a processor, vehicle acceleration and angular rate data from an inertial measurement sensor disposed proximal to the vehicle;
    receiving, by the processor, vehicle position and velocity data from a satellite navigation system receiver disposed proximal to the vehicle,
    estimating, by the processor, vehicle dynamic states by mechanizing inertial navigation system equations with input including the vehicle acceleration and angular rate data from the inertial measurement sensor at a system update rate, said estimating being accomplished in a first time interval $\Delta t$ said corresponding to a reciprocal of the system update rate; and
    updating, by the processor, the vehicle dynamic states with results of extended kalman filter matrix equations based on the received data from the inertial measurement sensor and on the received data from the satellite navigation system receiver, said updating including calculating at least a state transition matrix in a plurality of substeps na and subsequently a covariance matrix in a plurality of substeps np,
    determining, by the processor, whether a new position measurement has been received by the satellite navigation system receiver, and if the new position measurement has been received, updating the position states in a plurality of substeps npos if no new position measurement has been received, executing at least one blank step to maintain synchronization,
    determining, by the processor, whether a new velocity measurement has been received by the satellite navigation system receiver, and if the new velocity measurement has been received, updating the velocity motion states in a plurality of substeps nvel, or if no new velocity measurement has been received, executing at least one blank step to maintain synchronization,
    each of the substeps np being executed in an integration time interval $\Delta tp$ equal to $(nA +np +nvel +npos) \times \Delta t$ such that said updating said vehicle dynamic states is accomplished in a second time interval greater than the first time interval $\Delta t$.

2. The method of claim 1, further comprising:
    determining an estimate of a velocity error between a measured velocity of the vehicle and an estimated velocity state, wherein the estimated velocity state is one of the vehicle dynamic states and wherein the measured velocity is based at least in part on the vehicle position and velocity data from the satellite navigation system receiver; and
    determining an estimate of a position error between a measured position of the vehicle and an estimated position state, wherein the estimated position state is one of the vehicle dynamic states and wherein the measured position is based at least in part on the vehicle position and vehicle velocity data from the satellite navigation system receiver.

3. The method of claim 1, further comprising :
    outputting data indicative of at least a portion of the updated vehicle dynamic states to a control unit configured to control motion of the vehicle.

4. The method of claim 1, wherein the vehicle comprises an aircraft.

5. The method of claim 1, wherein the plurality of vehicle dynamic states comprises each of position in Earth-Centered Earth-Fixed coordinates, each of north, east, and down velocity in tangent frame, attitude quaternion elements, rate gyroscope bias, and gravity.

6. A system for estimating a plurality of vehicle dynamic states, the system comprising:
    a memory configured to store data associated with the vehicle dynamic states; and
    a processor configured to:
        receive vehicle acceleration and angular rate data from an inertial measurement sensor disposed proximal to the vehicle;
        receive vehicle position and velocity data from a satellite navigation system receiver disposed proximal to the vehicle,
        estimate vehicle dynamic states by mechanizing inertial navigation system equations with input including the vehicle acceleration and angular rate data from the inertial measurement sensor at a system update rate, in a first time interval $\Delta t$ corresponding to a reciprocal of the system update rate; and
        update the vehicle dynamic states with results of extended kalman filter matrix equations based on the received data from the inertial measurement sensor and on the received data from the satellite navigation system receiver, wherein the update includes calculating at least a state transition matrix in a plurality of substeps $n_a$ and subsequently a covariance matrix in a plurality of substeps $n_p$, determining whether a new position measurement has been received by the satellite navigation system receiver, and if the new position measurement has been received, updating the position states in a plurality of substeps $n_{pos}$, or if no new position measurement has been received, executing at least one blank step to maintain synchronization, determining whether a new velocity measurement has been received by the satellite navigation system receiver, and if the new velocity measurement has been received, updating the velocity motion states in a plurality of substeps $n_{vel}$, or if no new velocity measurement has been received, executing at least one blank step to maintain synchronization, each of the substeps $n_p$ being executed in an integration time interval $\Delta t_p$ equal to $(n_A+n_P+n_{vel}+n_{pos})\times\Delta t$ such that said updating said vehicle dynamic states is accomplished in a second time interval greater than the first time interval $\Delta t$.

7. The system of claim 6, wherein said processor is further configured to:

determine an estimate of a velocity error between a measured velocity of the vehicle and an estimated velocity state, wherein the estimated velocity state is one of the vehicle dynamic states and wherein the measured velocity is based at least in part on the vehicle position and velocity data from the satellite navigation system receiver; and determine an estimate of a position error between a measured position of the vehicle and an estimated position state, wherein the estimated position state is one of the vehicle dynamic states and wherein the measured position is based at least in part on the vehicle position and velocity data from the satellite navigation system receiver.

8. The system of claim 6, wherein the processor is further configured to output data indicative of at least a portion of the vehicle dynamic states of to a control unit configured to control motion of the vehicle.

9. The system of claim 8, wherein the processor is further configured to output a control signal based at least in part on the data indicative of at least a portion of the states of the vehicle.

10. The system of claim 6, wherein the vehicle comprises an aircraft.

11. The system of claim 6, wherein the vehicle dynamic states include each of position in Earth-Centered Earth-Fixed coordinates, each of north, east, and down velocity in tangent frame, attitude quaternion elements, rate gyroscope bias, and gravity.

12. A computer-program product for estimating a plurality of vehicle dynamic states:

a non-transitory computer-readable medium having stored thereon instructions executable by at least one processor for:

receiving by a processor vehicle acceleration and angular rate data from an inertial measurement sensor disposed proximal to the vehicle;

receiving by the processor vehicle position and velocity from a satellite navigation system receiver disposed proximal to the vehicle;

estimating vehicle dynamic states by mechanizing the inertial navigation system equations with input including vehicle acceleration and angular rate data from the inertial measurement sensor at a system update rate, said estimating being accomplished in a first time interval corresponding to $\Delta t$ a reciprocal of the system update rate; and updating the vehicle dynamic states with results of extended kalman filter matrix equations based on the received data from the inertial measurement sensor and on the received data from the satellite navigation system receiver, said updating including calculating at least a state transition matrix in a plurality of substeps $n_a$ and subsequently a covariance matrix in a plurality of substeps $n_p$, determining whether a new position measurement has been received by the satellite navigation system receiver, and if the new position measurement has been received, updating the position states in a plurality of substeps $n_{pos}$, or if no new position measurement has been received, executing at least one blank step to maintain synchronization, determining whether a new velocity measurement has been received by the satellite navigation system receiver, and if the new velocity measurement has been received, updating the velocity motion states in a plurality of substeps $n_{vel}$, or if no new velocity measurement has been received, executing at least one blank step to maintain synchronization, each of the substeps $n_p$ being executed in an integration time interval $\Delta t_p$ equal to $(n_A+n_P+n_{vel}+n_{pos})\times\Delta t$ such that said updating said vehicle dynamic states is accomplished in a second time interval greater than the first time interval $\Delta t$.

13. The product of claim 12, wherein the vehicle comprises an aircraft.

14. The product of claim 12, wherein the plurality of vehicle dynamic states comprises each of position in Earth-Centered Earth-Fixed coordinates, each of north, east, and down velocity in tangent frame, attitude quaternion elements, rate gyroscope bias, and gravity.

* * * * *